United States Patent [19]

Hesse et al.

[11] 4,101,398

[45] Jul. 18, 1978

[54] PROCESS FOR HARDENING A RESIN WHICH IS THE REACTION PRODUCT OF AN EPOXY RESIN, AN OLEFINICALLY UNSATURATED MONOCARBOXYLIC ACID AND A POLYCARBOXYLIC ACID ANHYDRIDE UNIT

[75] Inventors: Wolfgang Hesse, Wiesbaden; Paul Jacobi, Wiesbaden-Biebrich, both of Fed. Rep. of Germany

[73] Assignee: Hoechst Aktiengesellschaft, Frankfurt, Fed. Rep. of Germany

[21] Appl. No.: 702,352

[22] Filed: Jul. 2, 1976

Related U.S. Application Data

[63] Continuation of Ser. No. 487,983, Jul. 12, 1974, abandoned, which is a continuation-in-part of Ser. No. 239,332, Mar. 29, 1972, abandoned.

[30] Foreign Application Priority Data

Apr. 1, 1971 [DE] Fed. Rep. of Germany ....... 2115918

[51] Int. Cl.$^2$ .............................................. C08F 8/00
[52] U.S. Cl. .......................... 204/159.16; 204/159.14; 204/159.15; 204/159.19; 204/159.22; 260/837 R; 260/836
[58] Field of Search ...................... 204/159.15, 159.16, 204/159.17, 836, 837 R

[56] References Cited

U.S. PATENT DOCUMENTS

| | | | |
|---|---|---|---|
| 3,466,259 | 9/1969 | Jernigan | 260/37 |
| 3,564,074 | 2/1971 | Swisher et al. | 260/837 |
| 3,632,861 | 1/1972 | Hargis | 260/836 |
| 3,683,045 | 8/1972 | Baldwin | 260/837 R |

*Primary Examiner*—Richard B. Turer
*Attorney, Agent, or Firm*—Littlepage, Quaintance, Murphy, Richardson and Webner

[57] ABSTRACT

A process for hardening (I) a resin which is the reaction Product of a first reaction of a) an epoxy resin which contains at least two epoxy groups with b) an olefinically unsaturated monocarboxylic acid followed by a reaction with c) a carboxylic groups containing component; by copolymerizing said resin (I) with (II) a copolymerizable unsaturated monomer under the action of irradiation of an electron beam, one polycarboxylic acid unit of said carboxylic groups containing component being attached to at least two molecules of the epoxy resin the number of epoxy groups being approximately equal to the sum of the number of free carboxylic groups and the number of anhydride groups, the proportion being 1.25 to 1.5 equivalents of epoxyde per equivalent of unsaturated monocarboxylic acid and about 0.25 to 0.5 mol of carboxylic groups containing compound. The radiation dose may be as low as 0.25 Mrad/g resin. Shaped body which is obtained by the process and which may be a film, fibre or a coating.

16 Claims, No Drawings

PROCESS FOR HARDENING A RESIN WHICH IS THE REACTION PRODUCT OF AN EPOXY RESIN, AN OLEFINICALLY UNSATURATED MONOCARBOXYLIC ACID AND A POLYCARBOXYLIC ACID ANHYDRIDE UNIT

This is a continuation of application Ser. No. 487,983, filed Jul. 12, 1974 now abandoned which was a cip application of Ser. No. 239,332, filed Mar. 29, 1972 abandoned.

This invention is concerned with a process for hardening resins.

Epoxy resins may be hardened by means of a variety of different techniques and one convenient method is by use of an electron beam. This last mentioned technique offers the advantages of being accurate, in so far as the hardening may be localised, and rapid.

Bifunctional epoxy resins suitable for hardening with electron beams can be prepared from diphenylol propane and epichlorohydrin by esterifying these resins with unsaturated carboxylic acids, particularly with acrylic or methacrylic acid, and dissolving the esters in a copolymerisable monomer, preferably in esters of the above mentioned acids. To harden such resins it is however necessary to use a high does of radiation, e.g. 15 to 40 Mrad/g of resin, and this may be disadvantageous.

It is also known to esterify epoxy resins with an amount of an unsaturated monocarboxylic acid, e.g. acrylic or methacrylic acid, which amount is at least in part equivalent to the number of the epoxy groups, and to further esterify the products with a polycarboxylic acid, e.g. phthalic acid. In this procedure the epoxy groups are split by esterification. The polycarboxylic acid does react with the hydroxyl groups set free while forming semiesters. Hardening of such epoxy resins by radiation, particularly in a relatively small dose of radiation was however not known.

Esterification of epoxy resins with olefinically unsaturated monocarboxylic acids followed by hardening by irradiation in the presence of copolymerisable unsaturated monomers has been proposed but cross-linking which is occasionally desired is not achieved by this process and moreover the dose of radiation required is still too high for some purposes.

The present invention describes an epoxy based resin which may be hardened by a much smaller dose of radiation from an electron beam than has hitherto been shown to be possible.

The epoxy based resins are the reaction products of a first reaction of (a) an epoxy resin which contains at least two epoxy groups with (b) an olefinically unsaturated monocarboxylic acid followed by a reaction with c) a carboxylic groups containing component in which one polycarboxylic acid unit of said carboxylic groups containing component is attached to at least two molecules of the epoxy resin. The hardening process is carried out in the presence of copolymerisable unsaturated monomers.

The proportion of carboxylic groups containing compound used e.g. polycarboxylic acid anhydride or those which may contain in addition at least one free carboxyl group varies according to the reaction conditions and depends on the proportion of monocarboxylic acid and the number of epoxy groups. The three components are generally used in such proportions that the number of epoxy groups is approximately equal to the sum of the number of carboxyl groups of the monocarboxylic acid and the number of anhydride groups plus any free carboxyl groups of the carboxylic groups containing compound.

The number of epoxy groups is in the proportion of about 1.25 to 1.5 equivalents of epoxyde per equivalent of unsaturated monocarboxylic acid and about 0.25 to 0.5 mol of carboxylic groups containing compound.

It has frequently been found that the resins prepared according to the invention can be hardened by a dose of radiation which may be less than 1/10 of the dose which has previously been considered necessary.

An epoxy resin which contains at least two epoxy groups may first be esterified with less than an equivalent quantity of at least one olefinically unsaturated monocarboxylic acid with respect to the amount of epoxy groups present, e.g. with less than 2 mols, and the remaining free epoxy groups may then be partly or completely esterified with the polycarboxylic acid anhydride.

The polyfunctional epoxy resins used may be, for example, those obtained from Novolaks, diphenylolpropane or di- or triphenylolmethane and epichlorohydrin or condensation products of aroxychlorohydrins such as phenoxychlorohydrin, optionally with the addition of chlorine-free hydroxyl-containing phenol ethers, and formaldehyde which have been prepared with subsequent elimination of hydrogen chloride. The bifunctional epoxy resins used are preferably bisglycidyl ethers of diphenylolpropane or diphenylolmethane but bifunctional epoxy resins with a higher molecular weight may also be used. Furthermore, epoxy resins substituted with halogen may be used, e.g. epoxy resins which contain chlorine or bromine such as those obtained from 3,5,3',5'-tetrachloro- or -tetrabromo-diphenylolpropane and epichlorohydrin.

The molecular weight of the epoxy resins is generally from 312 to 2000, preferably from 312 to 1000.

The unsaturated monocarboxylic acids used may be, for example, those which contain 3 to 6 C atoms, preferably 3 or 4 C atoms, such as methacrylic acid, crotonic acid or preferably acrylic acid. Examples of suitable polycarboxylic acid anhydrides for the reaction with the unsaturated partly esterified epoxy resin, in particular the reaction with monoesters of bifunctional epoxy resins, are trimellitic anhydride, pyromellitic anhydride, phthalic anhydride, maleic anhydride and succinic anhydride.

The sequence in which the components are reacted is preferably not arbitrary. The polyfunctional epoxy resins are preferably first reacted with more than 1 mol of unsaturated monocarboxylic acids, and the polycarboxylic acid anhydride is added thereafter. When, for example, 2 mols of the bisglycidyl ether of diphenylolpropane are reacted with 3 mols of acrylic acid, three free hydroxyl groups are first obtained from the epoxy groups, and these free hydroxyl groups then react with the polycarboxylic acid anhydrides. The unbound carboxyl groups liberated in the reaction and the carboxyl groups originally present in anhydrides of carboxylic acids which are at least tribasic react with the remaining epoxy groups of the epoxy resin. If instead of simple anhydrides there are used those which also contain carboxyl groups, e.g. trimellitic anhydride, the number of epoxy groups put into the reaction should be increased accordingly. In that case, the polycarboxylic acid anhydride may also be reacted on the one hand with the remaining epoxy groups of the epoxy resin and on the other hand with one of the free hydroxyl groups of another molecule of the epoxy resin, which free hydroxyl groups have been obtained from an epoxy group in the reaction with the unsaturated monocarboxylic acid. Chain lengthening or cross-linking can be achieved in this way.

Owing to the sensitivity of the unsaturated radical to heat, the reactions between epoxy resins, unsaturated monocarboxylic acids and acid anhydrides are generally carried out at temperatures of at least 70° C, preferably at least 80° C and not more than 140° C, preferably not more than 120 or 110° C in the presence of catalysts, e.g. cationic catalysts such as an alkali metal methylate, e.g. sodium or potassium methylate, but preferably an amine such as mono-, di- or trialkylamine or an alkylarylamine. Suitable catalysts include N-methylaniline, diethylamine, dipropylamine, triethylamine and trimethylamine. In addition, it is advisable to add a polymerisation inhibitor such as hydroquinone or t-butyl hydroquinone as stabilizer as is usual in the preparation of such resins.

The esterified epoxy resin is mixed with a copolymerisable monomer before it is hardened. Suitable copolymerisable monomers for this purpose are, in particular, vinyl compounds such as monofunctional and/or polyfunctional esters of acrylic or methacrylic acid in which the alcohol component generally contains 1 to 18 and preferably 1 to 6 C atoms and generally has 1 to 6 and preferably 1 or 2 OH groups available for esterification, e.g. esters of acrylic or methacrylic acid with methyl, ethyl, ethylhexyl or dodecyl alcohol, ethanediol, propane-1,2- or -1,3-diol or butane-1,2- to 1,4-diol, glycerol, pentaerythritol or sorbitol. Part of the OH groups in the polyhydric alcohols may be present as free OH groups.

Owing to the very high rate of hardening of the resins, other monomers such as styrene, acrylonitrile, the various vinyl toluenes, divinylbenzene, maleic acid esters of alcohols with 1 to 4 C atoms, allyl esters of phthalic acid or the like may also be used, either alone or as mixtures. Hardening at elevated temperatures in that case at the same time results in a copolymerisation of the unsaturated esterified epoxy resins.

When the resins are hardened in accordance with the invention by means of electron beams, the dose of radiation required may be surprisingly low. Doses in the region e.g. of only 0.25 to 2 Mrad may be used and rapid rates of hardening are possible. Higher doses of radiation may, of course, be employed if desired. When thick coatings based on resins prepared according to the invention are hardened on bands or plates, the rate of coating, which may be carried out at room temperature, may be increased, for example to 100 meters per minute. The coating is generally applied in a thickness of up to 500 μ.

The process of hardening according to the invention is applicable to coatings applied by brushing coating or any of the other usual techniques. If the layer to be hardened is sufficiently thick, the process may also be used for hardening shaped products such as fibres or foils.

According to one embodiment of the invention, the epoxy resins may be hardened, for example, with or without the addition of pigments and optionally other conventional additives. It is surprising that the elasticity of the hardened films increases with the functionality of the esterified resins, that is to say with the number of polymerisable double bonds per molecule. The films also have good resistance to chemicals and solvents. In cases where hardening is effected e.g. with simultaneous copolymerisation by peroxide, the resins have less surface tackiness than the known resins, and even the amount of surface tackiness which does remain diminishes with increasing functionality of the esterified resin. It may be so slight, especially in the case of systems which contain fillers, that the films can be removed immediately after the hardening process.

The following examples in which the parts given represent parts by weight illustrate the invention.

EXAMPLE 1

Trifunctional polyester of 2 mols of epoxy resin, 3 mols of acrylic acid and 1 mol of phthalic anhydride.

1900 Parts of an epoxy resin of diphenylolpropane and epichlorohydrin which has an epoxy equivalent weight of 190 are esterified with 540 parts of acrylic acid in the presence of 0.625 parts of hydroquinone and 8.25 parts of N,N-dimethylaniline at 90° C until the acid number is about 20 and the epoxy number about 1.8. 370 Parts of phthalic anhydride are then added and the reaction is continued at 90° C until the acid number is again about 20 and the epoxy number about 0.2 to 0.4. At that stage, the reaction mixture is dissolved in 712 parts of ethyl acrylate to form an 80% solution. The viscosity is 14,000 to 20,000 cP.

The resin is applied to glass plates to form a film which has a thickness of 100 μ and irradiated, using a Dynacote electron accelerator. The resin is exposed to doses of 0.25, 0.5, 1.0 and 2.0 Mrad/g at an acceleration voltage of 130 KV. Cross-linking is optimal after irradiation with 0.5 or 1.0 Mrad/g and is not improved by increasing the dose. The film obtained is light in colour and clear. Immediately after irradiation, it has a pendulum hardness (according to König) of 130 seconds. When wiped with acetone or xylene the film proved to be resistant to attack by these chemicals.

EXAMPLE 2

Esterification of a cresol-Novolak epoxy resin with acrylic acid and phthalic anhydride.

350 Parts of an epoxy resin based on a cresol-Novolak and epichlorohydrin (epoxy eqivalent 300) having an average molecular weight of 1200 to 1500 are esterified with 73.5 parts of acrylic acid at 80° C in the presence of 0.25 parts of hydroquinone and 1.5 parts of N,N-dimethylaniline. When an acid number of 5 is reached, 22 parts of phthalic anhydride are added and esterification is continued at 80° C until the acid number is 7. The resulting resin is diluted with 224 parts of methyl methacrylate to a resin content of 66%. The viscosity of this resin is 1500 cP, the yield 650 parts.

After the treatment described in Example 1, the resin has optimum properties after irradiation with only 0.5 Mrad/g. The properties of the film are as indicated in Example 1. The pendulum hardness is 110 sec.

EXAMPLE 3

Ester resin of epoxy resin, acrylic acid and trimellitic anhydride.

570 Parts of an epoxy resin according to Example 1 (epoxy equivalent weight 190) are esterified with 144 parts of acrylic acid at 90° C in the presence of 0.1 part of hydroquinone and 5 parts of diisobutylamine until the acid number is 5 to 10 and the epoxy number 2.3. 77 Parts of finely powdered trimellitic anhydride are then added and the reaction mixture is esterified to an acid number of 15 to 20 and an epoxy number of 0.1 to 0.2 at 90° C. When these values have been obtained, 425 parts of triethylene glycol methacrylate are added to the resin, and about 1200 parts of a 66% resin solution which has a viscosity of 5800 cP are obtained. 100 Parts of this solution are finely ground together with 250 parts of finely powdered chalk and the resulting composition which is suitable for use as a surface filler is applied to panels of chipwood. Hardening is carried out as described in Example 1 and requires a radiation dose of 0.25 to 0.5 Mrad/g for optimum results. The surface of the coating is dry and hard and can be rubbed down immediately after hardening.

What we claim is:

1. A process for hardening (I) a resin which is the reaction product of a first reaction of a) an epoxy resin which contains at least two epoxy groups, with b) an olefinically unsaturated monocarboxylic acid followed by a reaction of free hydroxyl groups formed from the epoxidecarboxylic acid reaction with c) a polycarboxylic acid anhydride unit, by copolymerising said resin (I) with (II) a copolymerisable olefinically unsaturated monomer under the action of irradiation of an electron beam of a minimum radiation dose of 0.25 Mrad/g of reaction product, one polycarboxylic acid anhydride unit being attached to at least two molecules of the epoxy resin, the number of epoxy groups being approximately equal to the sum of the number of free carboxyl groups and the number of anhydride groups of the polycarboxylic acid anhydride units, the epoxide being in the proportion of about 1.25 to 1.5 equivalents of epoxide per equivalent of unsaturated monocarboxylic acid and about 0.25 to 0.5 mol of polycarboxylic acid anhydride units.

2. A process for hardening (I) a resin which is the reaction product of a first reaction of (a) an epoxy resin which contains at least two epoxy groups, with (b) an olefinically unsaturated monocarboxylic acid having 3 to 6 carbon atoms followed by a reaction of free hydroxyl groups formed from the epoxide-carboxylic acid reaction with c) a polycarboxylic acid anhydride unit having 4 to 10 carbon atoms, by copolymerising said resin (I) with (II) a copolymerisable olefinically unsaturated monomer under the action of irradiation of an electron beam of a radiation dose of from 0.25 to 2.0 Mrad/g of reaction product, one polycarboxylic acid anhydride unit being attached to at least two molecules of the epoxy resin, the number of the epoxy groups being approximately equal to the sum of the number of free carboxylic groups and the number of anhydride groups of the polycarboxylic acid anhydride units, the epoxide being in the proportion of about 1.25 to 1.5 equivalents of epoxide per equivalent of unsaturated monocarboxylic acid and about 0.25 to 0.5 mo. of polycarboxylic acid anhydride units.

3. A process as claimed in claim 1 wherein the epoxy resin is a condensation product of a compound selected from the group consisting of novolak, diphenylolpropane, di- and triphenylolmethane 3,5-3',5'-tetrachloro- or -bromo- diphenylolpropane.

4. A process as claimed in claim 1 wherein the molecular weight of the epoxy resin is from 312 to 2000.

5. A process as claimed in claim 1 wherein the unsaturated monocarboxylic acid contains 3 to 6 C atoms.

6. A process as claimed in claim 1 wherein the polycarboxylic acid anhydride unit is selected from the group consisting of polycarboxylic acid anhydride and polycarboxylic acid anhydride containing in addition at least one carboxylic group.

7. A process as claimed in claim 1 wherein the polycarboxylic acid anhydride unit is selected from the group consisting of polycarboxylic acid anhydride and polycarboxylic acid anhydride containing in addition at least one carboxylic group.

8. A process as claimed in claim 1 wherein the reaction between the epoxy resin, the unsaturated monocarboxylic acid and the polycarboxylic acid anhydride unit is carried out at a temperature from 70° to 140° C.

9. A process as claimed in claim 1 in which the epoxy resin is reacted with the olefinically unsaturated monocarboxylic acid and the polycarboxylic acid anhydride in the presence of a catalyst, and a compound selected from the group consisting of hydroquinone and t-butyl hydroquinone and mixtures thereof.

10. A process as claimed in claim 1, in which the epoxy resin is formed by dehydrochlorination of a condensation product of phenoxychlorhydrine and formaldehyde.

11. A shaped body whenever obtained by a process as claimed in claim 1.

12. A shaped body as claimed in claim 11 which is a film or fibre.

13. A shaped body as claimed in claim 11 which is a coating.

14. A process for hardening a resin (I0) which is the reaction product of:
   a. an epoxy resin which is the bisglycidyl ether of diphenylolpropane or diphenylol methane which is first reacted with
   b. an olefinically unsaturated monocarboxylic acid selected from the group consisting of acrylic acid, methacrylic acid, and crotonic acid, followed by a reaction of free hydroxyl groups formed from the epoxide-carboxylic acid reaction with
   c. a polycarboxylic acid anhydride unit selected from the group consisting of trimellitic anhydride, phthalic anhydride, and succinic anhydride and a mixture thereof by copolymerising said resin (I) with (II) a copolymerisable monomer selected from the group consisting of esters of acrylic or methycrylic acid with an alcohol selected from the group consisting of methyl alcohol, ethyl alcohol, ethylhexyl alcohol, dodecyl alcohol, ethane diol, 1,2-propane diol, 1,3-propane, 1,2-butane diol, 1,4-butane diol, glycerol, pentaerythritol, and sorbitol; styrene; acrylonitrile; vinyl toluene; divinyl benzene maleic acid, esters of alcohols having 1 to 4 carbon atoms and alkyl esters of phthalic acid;
   wherein on polycarboxylic unit of said polycarboxylic acid anhydride units is attached to at least two molecules of the epoxy resin,
   wherein the resin is irradiated with an electron beam to a dose of from 0.25 to 2.0 Mrad/g of resin,
   wherein one mole of the epoxy resin (a) is reacted with less than 2 moles of monocarboxylic acid (b), the remaining free epoxy groups being reacted with an amount of the polycarboxylic acid anhydride unit such that the number of free epoxy groups approximately equals the total of the anhydride groups of the polycarboxylic acid anhydride units and the free carboxylic groups of the polycarboxylic acid anhydride unit, the number of the epoxide groups of resin (a) being in the proportion of about 1.25 to 1.5 equivalents of epoxide per equivalent of unsaturated monocarboxylic acid and about 0.25 to 0.5 mol of polycarboxylic acid anhydride units.

15. A process for hardening (I) a resin which is the reaction product of a first reaction of a) an epoxy resin which contains at least two epoxy groups, with b) an olefinically unsaturated monocarboxylic acid followed by a reaction free hydroxyl groups formed from the epoxide-carboxylic acid reaction with c) a polycarboxylic acid anhydride unit, by copolymerising said resin (I) with (II) a copolymerisable olefinically unsaturated monomer under the action of irradiation of an electron beam of a radiation dose of 0.25 to 2.0 Mrad/g of reaction product, one polycarboxylic acid anhydride being attached to at least two molecules of the epoxy resin, the number of epoxy groups being approximately equal to the sum of the number of free carboxyl groups and the number of anhydride groups of the polycarboxylic acid anhydride units, the epoxide being in the proportion of about 1.33 to 1.5 equivalents of epoxide per equivalent of unsaturated monocarboxylic acid and about 0.33 to 0.5 mol of polycarboxylic acid anhydride units.

16. A process as claimed in claim 1 wherein said reaction product is prepared by the successive esterifying steps of:

(I) an epoxy resin which contains at least two epoxy groups with less than one equivalent amount of unsaturated monocarboxylic acid, based on the epoxy groups, (II) the product of I, which contains the resulting hydroxyl groups from process Step I with polycarboxylic acid anhydride units and (III) the product of II which contains the resulting carboxylic groups from process Step II with the remaining unchanged epoxy groups from process Step I.

* * * * *